United States Patent Office 3,475,179
Patented Oct. 28, 1969

3,475,179
TREATMENT OF ANIMAL BY-PRODUCTS
Ward Harris Smith, Denver, Colo., assignor to Birko Chemical Corporation, Denver, Colo., a corporation of Washington
No Drawing. Continuation-in-part of applications Ser. No. 490,721, Sept. 27, 1965, and Ser. No. 548,391, May 9, 1966. This application Jan. 23, 1969, Ser. No. 793,544
Int. Cl. A22c 17/08
U.S. Cl. 99—107          7 Claims

ABSTRACT OF THE DISCLOSURE

A treatment of non-muscle animal by-products such as offal, tallow, tripe and the like, treats an initially hot alkaline washed animal by-product in a hot aqueous solution of a non-toxic, hydroxy organic acid to reduce the pH of the effluent water to about neutral, and subsequently treating the by-product with an aqueous solution of a non-toxic, hydroxy organic acid at a substantially lower temperature followed by a cool water rinse.

---

This application is a continuation-in-part of U.S. application Ser. No. 490,721, filed Sept. 27, 1965, for Animal By-Product Treatment, now abandoned, and U.S. application Ser. No. 548,391, filed May 9, 1966, for Treatment of Animal By-Products, now abandoned.

In my earlier U.S. Patent 3,025,166, issued Mar. 13, 1962, I have described an efficient cleaning treatment for non-muscle animal products which cleans, defats, and produces a product of lighter color faster and easier than processes known to that time. The treatment is an alkaline wash which breaks up the sugar residues and actually increases the yield of such animal products. The process of that patent includes a series of washing stages using alkaline materials, followed by a percarbonate treatment which increases the detergency action of the wash material on such animal products. This produces cleaner, more brilliant finished products. Animal products treated by the process of my earlier patent, or by equivalent methods, may be advantageously subjected to the present treatment to reduce overall wash time, and produce highly acceptable products. Even with the reduced wash time the efficiency of the washing is increased, and there is an additional increase of yield of product.

Animal by-products which are amenable to the process of the invention include other types of products than the more common non-muscle type meat for food consumption. These animal products constitute a by-product to the meat packing industry and provides means for reducing the animal unit cost of the industry. In some instances, the profit of the operation is largely determined by the sale of the animal by-products. Proper initial treatment of the animal by-products is, therefore, a matter of great importance to the economy of the industry. Additionally, since much of the animal by-product is used either as a food or a food ingredient, it is controlled by government authorities to insure proper handling and producing edible products. It has been found, furthermore, that attractive, clean product produces better sales of such animal by-products.

According to the present invention a non-muscle animal by-product which has been initially washed with an alkaline wash is first treated with a hot aqueous solution containing a sufficient amount of a non-toxic, hydroxy organic acid to bring the pH of the effluent water to about 7 or about neutral. A second treatment treats the animal with a similar acid solution at a substantial lower temperature and having sufficient non-toxic, hydroxy organic acid to neutralize residual alkaline material on the product, producing a product having a pH of about 7. Finally the resulting product is flushed with a cold water rinse to reduce the temperature about room temperature or below.

The present invention provides a control for the treatment of animal by-products which must be washed and treated before marketing, so as to yield a reproducible product according to standards of neutralization and quality which are required by both national and export consumers.

Included among the objects and advantages of the present invention is to provide a treatment of animal by-products which reduces the alkaline content thereof, eliminates soapy or gaseous product and increases the holding quality (shelf life) of the product. A process according to the invention, additionally, reduces lime or other calcium deposits on the product and equipment, and permits processors in areas of high alkaline content water to economically and readily wash and treat the non-muscle animal by-products to produce high quality consumer acceptable products.

A further object of the invention is to reduce red iron stain which has heretofore discolored white animal by-products.

The objects and advantages of the invention may be achieved by carrying out the processes outlined below which is intended as illustrative of the invention and not by way of limitation.

The treatment of the invention is applicable to various non-muscle animal products and offal, and the specific examples given below illustrate the preparation of tripe. Tripe is particularly difficult to treat so as to produce a brilliant white product which retains this and other qualities for a substantial period of time. A particularly effective washing procedure is set up below, entitled Pre-Treatment of Tripe, which prepares tripe for subsequent treatment by the process of this invention, but it is obvious other washing procedures may be used to produce a clean product ready for the treatment according to the present invention.

PRE-TREATMENT OF TRIPE

About 50 tripe are placed in a tripe scalder (mechanical washing machine for animal by-products) and are first rinsed in cold water, then with a solution of a detergent, which may be an alkaline detergent such as caustic soda, soda ash, sodium metasilicate, etc. The resulting tripe is then rinsed in cold water to remove a substantial percentage of the alkaline material, and following this cold rinse the tripe is rinsed in warm water. Following the warm water rinse, the tripe is washed in a hot detergent solution, approximately 135° F. After this hot washing, the tripe is rinsed in hot water of about 140° F. Following the hot rinse, the tripe may be washed with a peroxide solution, as for example, sodium carbonate peroxide (sodium percarbonate) at a still higher temperature (about 145° F.) and then the tripe is successively rinsed in water of decreasing temperature.

The resultant washed tripe (also other offal or non-muscle by-products) may be treated by the process of the invention (set out below) to produce a neutralized product which has an increased color quality, being brightened and of increased whiteness, and better holding qualities.

The process includes a treatment of the resultant washed tripe or other product with a hot aqueous solution of a non-toxic, low molecular weight, hydroxy aliphatic polycarboxylic acids, particularly malic acid, tartaric acid, lactic acid and citric acid. Preferably, the acids are those normally found in various edible foods or food derivatives; however, such acids as isocitric acid, dl-citramalic, dl-2-hydroxy-2-methyl butanedioic acid, desoxalic acid (1,2-dihydroxy-1, 1,2-ethanetricarboxylic acid) may be used. In some instances, the sodium salt or the sodium hydrogen salt may be used in place of the acid.

EXAMPLE I

The tripe from the pretreatment given above is placed in a scalder, about 50 pounds of the washed tripe, with about 50 gallons of about 120° F. water. To the mixture is added from 1 to 4 ounces of lactic acid, and the mixture is agitated in the scalder for about 5 minutes. Where the pH of the solution goes above 7, small amounts of lactic acid may be added to reduce it to about 7. It is desirable to have the pH of the solution at about 7 by the end of the treatment cycle. As the agitation, caused by the scalder, continues unwashed surfaces on the tripe, containing alkaline detergent, may be continually exposed to the solution. In highly alkaline water substantial amounts of the acid may have to be added during the treatment time. The scalder is operated for a sufficient time to thoroughly contact all parts of such products, usually about 5 minutes. At the end of about 5 minutes the solution is drained from the tripe and an additional load of about 50 gallons of water is charged into the scalder with the tripe. This water should be at a lower temperature, about 70° F. To the load of tripe and water is added sufficient lactic acid to produce a solution pH of 7. The load is agitated for about 5 minutes, occasionally checking the pH so as to maintain it at about 7 by addition of more lactic acid. Following this second 5 minutes treatment stage, the solution is drained from the tripe. Cold water is then agitated with the tripe for about 3 minutes to cool the tripe to about room temperature or lower if possible.

The first treatment is preferably in a temperature range of 100°–150°F. and the second treatment in a range of 60°–80° F. Using a pretreatment such as described above permits reducing the time of the final wash steps with decreasing water temperatures, since the first treatment is preferably done in the 100°–150° F. range. This, after the treatment with hot sodium carbonate peroxide, one or two hot rinses with water (about 145° F.) prepares the tripe for the first hot treatment with the acid solution. Subsequent treatments then reduce the temperature of the tripe. The overall time of treatment of the tripe is reduced.

Example II

In a machine washer such as set out above, about 50 gallons of water at a preferable temperature of about 120° F., with from 1–4 ounces of citric acid or sodium citrate (or in a sufficient amount to bring the water to about pH 7 or neutral) is used to treat the tripe with agitation for a period of about 5 minutes. Such treatment includes agitating the tripe in the treatment solution to thoroughly contact the tripe with the solution. The temperature, however, may be in the range of about 100° F.– 150° F. The tripe is then drained and an additional load of water is added to the tripe at a temperature range of from 60° F.–80° F. with sufficient citric acid or sodium citrate to produce a neutral pH of the solution and the tripe load, normally requiring from 1–4 ounces of the acid in the second rinse. The second treatment time is approximately 5 minutes. After the second acid treatment the tripe is then flushed with cold water (tap water) for about 3 minutes.

Since the washing of any by-product or offal is normally conducted through at least one or two hot washes and one or two hot rinses, the total washing time of the process may be reduced by using a washing cycle with the hot washes and then using one, two or more hot rinses and then treating the animal by-product with the hot acid washes rather than going through a cooling cycle following the hot wash. In this manner, the animal by-product can be treated according to the present invention with the hot washes, hot rinses with aqueous acid solution and then through one or more cooling washes with an aqueous acid solution, and finally the cold water flush to reduce the temperature of animal by-product load to at least room temperature or below. In this manner, the total washing time is considerably decreased and there is an actual increase in yield of the animal by-product or offal. Additionally, this saves expensive manpower, thereby reducing the cost of the product. The color quality of the by-product or offal is increased by brightening, and in the case of tripe the whiteness is increased, producing a better and more salable product.

In many areas of the world, the iron content of the water is sufficient to actually discolor the animal by-product with a reddish brown stain, and it has been found by using the non-toxic acid rinse the iron content of the water is counteracted so that the animal by-product is not colored. This increases the brightness of color of the product. In the case of tripe, which is white product, the whiteness and brightness is substantially increased, producing a higher quality product. Also, in other parts of the world various water strata during different seasons of the year contain different amounts of alkali in the water. The non-toxic acid neutralizes this alkali, producing a higher quality product washed in such water. This is important in those areas where drouth is a particular problem, since as the drouth increases, the alkali content in the water substantially increases, and in some instances the alkali content increases so much that special treatment of the water is necessary before animal by-products may be properly treated. In those areas of high iron content in the water, the alkalis increase iron complexes which produce a reddish brown stain in animal fat. The non-toxic acid treatment provides an inexpensive and highly effective method of counteracting the deleterious effects of the alkali water and the iron water. The citric acid or lactic acid treatment is particularly effective since many foods already contain these acids and if any residual amount is left on the offal products it is not harmful to the product or consumer.

The acids useful in the process of this invention are relatively inexpensive, but are highly effective for producing superior products. The overall savings in processing offal and non-muscle animal products is significant, as is the increased recovery in product. The sodium salts of the acids are in some respects very effective to overcome the deleterious effects of alkalinity in the water, and reduction of iron stain. Thus, the invention contemplates non-toxic, hydroxy-polycarboxylic acids and sodium salts thereof, where the acids are aliphatic compounds having from 3 to 6 carbon atoms.

While the invention has been illustrated by reference to specific embodiments, there is no intent to limit the spirit or scope of the invention to the precise details so set forth except as defined in the following claims.

I claim:

1. The treatment of edible non-muscle animal by-products selected from the group consisting of tallow, tripe and offal, which have been initially washed with alkaline detergents and at least initially rinsed with water, which comprises treating the initially washed by-product in at least one at least warm aqueous solution, in a temperature range of 100°–150° F., of a non-toxic hydroxy aliphatic polycarboxylic acid containing from 3 to 6 carbon atoms or a sodium salt thereof for a period of about five minutes which is sufficient to thoroughly contact substantially all parts of such product, said acid being present in a sufficient quantity to produce a pH of about 7 in said solution by the end of said treatment stage; draining said by-products, and then rinsing said product with cold water to reduce its temperature to about room temperature.

2. The treatment of claim 1 wherein said acid treatment is performed on said product twice before rinsing in cold water, said first treating acid solution having said temperature and the second treating acid solution having a temperature of from 60° F.–80° F., said second acid treatment being for a period of about 5 minutes.

3. The treatment of claim 1 wherein said acid is citric.

4. The treatment of claim 1 wherein said acid is lactic acid.

5. The treatment of claim 1 wherein said acid is malic acid.

6. The treatment of claim 1 wherein said acid is tartaric acid.

7. The treatment of claim 1 wherein said acid is isocitric acid.

References Cited

UNITED STATES PATENTS

| | | | |
|---|---|---|---|
| 3,025,166 | 3/1962 | Smith | 99—107 |
| 3,346,401 | 10/1967 | Barat | 99—175 |

HYMAN LORD, Primary Examiner

U.S. Cl. X.R.

99—175